(12) United States Patent
Saito et al.

(10) Patent No.: US 8,692,506 B2
(45) Date of Patent: Apr. 8, 2014

(54) CHARGING APPARATUS AND CHARGING/DISCHARGING APPARATUS INCLUDING TEMPERATURE ADJUSTING ELEMENT OF SECONDARY BATTERY FOR BUFFERING

(75) Inventors: Takashi Saito, Sagamihara (JP); Kazuaki Utsumi, Sagamihara (JP)

(73) Assignee: NEC Corporation, Tokyo (JP)

( * ) Notice: Subject to any disclaimer, the term of this patent is extended or adjusted under 35 U.S.C. 154(b) by 230 days.

(21) Appl. No.: 12/282,826

(22) PCT Filed: Mar. 9, 2007

(86) PCT No.: PCT/JP2007/054629
§ 371 (c)(1),
(2), (4) Date: Sep. 12, 2008

(87) PCT Pub. No.: WO2007/105612
PCT Pub. Date: Sep. 20, 2007

(65) Prior Publication Data
US 2009/0200987 A1    Aug. 13, 2009

(30) Foreign Application Priority Data

Mar. 15, 2006    (JP) .................................. 2006-070870

(51) Int. Cl.
*H02J 7/00*    (2006.01)
(52) U.S. Cl.
CPC ..................................... *H02J 7/0054* (2013.01)
USPC ......................................................... 320/103
(58) Field of Classification Search
USPC ................... 320/103, 104, DIG. 14, 105, 150
See application file for complete search history.

(56) References Cited

U.S. PATENT DOCUMENTS 5,162,720 A * 11/1992 Lambert ........................ 320/104
5,871,859 A *  2/1999 Parise ........................... 320/150

(Continued)

FOREIGN PATENT DOCUMENTS

CN    1319514 A    10/2001
JP    371564 U     7/1991

(Continued)

OTHER PUBLICATIONS

English Machine Translation of JP2005-302698.*

(Continued)

*Primary Examiner* — Yalkew Fantu
*Assistant Examiner* — Manuel Hernandez
(74) *Attorney, Agent, or Firm* — Sughrue Mion, PLLC

(57) ABSTRACT

Charging apparatus 10 includes secondary battery 13 used for buffering, rectifier 11 that supplies direct current power to secondary battery 13 used for buffering, DC-DC converter 14 connected to driving battery 3 in electric vehicle 2 via charging cable 4, switching control circuit 12, and isothermal wind generator 16 that adjusts the temperature of secondary battery 13 used for buffering from outside of secondary battery 13 used for buffering. Switching control circuit 12 switches charging apparatus 10 between a first mode in which power supplied by rectifier 11 is accumulated in secondary battery 13 used for buffering and a second mode in which driving battery 3 is charged with the power supplied by secondary battery 13 used for buffering. Secondary battery 13 used for buffering includes at least one cell in which a battery element with a positive electrode plate and a negative electrode plate that are laminated therein is sealed with an outer cover film.

17 Claims, 3 Drawing Sheets

(56) References Cited

U.S. PATENT DOCUMENTS

| | | | | |
|---|---|---|---|---|
| 5,883,496 | A * | 3/1999 | Esaki et al. | 320/132 |
| 5,939,864 | A * | 8/1999 | Lenhart et al. | 320/137 |
| 6,104,160 | A * | 8/2000 | Iwata et al. | 320/103 |
| 6,181,100 | B1 * | 1/2001 | Shoji | 320/103 |
| 6,188,202 | B1 * | 2/2001 | Yagi et al. | 320/150 |
| 7,622,897 | B2 * | 11/2009 | Eberhard et al. | 320/150 |
| 2001/0026142 | A1 * | 10/2001 | Furukawa et al. | 320/103 |
| 2006/0028182 | A1 * | 2/2006 | Yang et al. | 320/150 |
| 2008/0197801 | A1 * | 8/2008 | Manor et al. | 320/103 |

FOREIGN PATENT DOCUMENTS

| | | |
|---|---|---|
| JP | 5-207668 A | 8/1993 |
| JP | 6-253461 A | 9/1994 |
| JP | 6253461 A | 9/1994 |
| JP | 9-159738 A | 6/1997 |
| JP | 11-55869 A | 2/1999 |
| JP | 11-289676 A | 10/1999 |
| JP | 200092614 A | 3/2000 |
| JP | 200112241 A | 1/2001 |
| JP | 2001-95171 A | 4/2001 |
| JP | 2002-345163 A | 11/2002 |
| JP | 200332901 A | 1/2003 |
| JP | 2003-142166 A | 5/2003 |
| JP | 2003341448 A | 12/2003 |
| JP | 2004171897 A | 6/2004 |
| JP | 2005-302698 A | 10/2005 |
| JP | 2005302698 A | 10/2005 |

OTHER PUBLICATIONS

The State Intellectual Property Office of the People's Republic of China First Office Action for appliction No. 200780009161.5, Issued Jun. 2, 2010.*
JP2002345163 English abstract.*
JP2001095171 English abstract.*
Japanese Office Action 2008-505097 dated Jun. 26, 2012.
Communication dated Nov. 1, 2012 issued by the Japanese Patent Office in counterpart Japanese Patent Application No. 2008-505097.
Office Action, dated Apr. 9, 2013, issued by the Japanese Patent Office in counterpart Japanese Application No. 2008-505097.
Office Action issued by the Japanese Patent Office dated Sep. 17, 2013 in counterpart Application No. 2008-505097.

* cited by examiner

CHARGING APPARATUS AND CHARGING/DISCHARGING APPARATUS INCLUDING TEMPERATURE ADJUSTING ELEMENT OF SECONDARY BATTERY FOR BUFFERING

TECHNICAL FIELD

The present invention relates to a charging apparatus and a charging-discharging apparatus for a secondary battery, and in particular, to a charging apparatus and a charging-discharging apparatus for a film covered laminate battery in which a positive electrode and a negative electrode are laminated and sealed with an outer cover material.

BACKGROUND ART

Secondary batteries can be repeatedly used by means of charging and are thus used as power sources for various electric apparatuses. Moreover, in recent years, high-capacity secondary batteries have also been developed and used as power sources for hybrid and electric vehicles. Furthermore, various improvements have been made on a charging apparatus for charging a secondary battery and on a charging apparatus with a discharging function.

For example, one capability that is required for charging apparatuses is a reduction in charging time. The reduction in charging time is particularly important for a charging apparatus that charges a secondary battery in an electric vehicle. As the use of electric vehicles becomes widespread, the expectation is that secondary batteries will be supplied with energy in a way similar to that in which gasoline powered vehicles are supplied with gasoline at service stations. In this case, the user of the vehicle moves the vehicle to a charging station, where the user charges the secondary battery in the vehicle.

Japanese Patent Laid-Open No. 5-207668 discloses a charging apparatus intended to complete charging a secondary battery in a time equivalent to that required to supply gasoline to a gasoline-powered vehicle at a service station. The charging apparatus includes a rectifier that converts commercial alternating current power into direct current power, a secondary battery for buffering, and a charger that controls low-current charging for and discharging from the secondary batter for buffering. If the secondary battery in the vehicle is not charged, direct current converted by the rectifier is input to the secondary battery used for buffering via the charger to charge the secondary battery used for buffering with low current. If the secondary battery in the vehicle is charged, the direct current power charged in the secondary battery used for buffering is input to the secondary battery in the vehicle via the charger. Thus, the secondary battery in the vehicle is charged with high current, that is, the secondary battery is rapidly charged.

On the other hand, a charging/discharging apparatus is used in, for example, a stage of developing a secondary battery or a process of manufacturing a secondary battery, to test the charging and discharging characteristics of the secondary battery. For example, Japanese Patent Laid-Open No. 9-159738 discloses a charging/discharging apparatus including a charging power source, an electronic loading device, and a secondary battery for buffering. In the charging/discharging apparatus, to charge a secondary battery used for testing, the charging power source and the secondary battery used for buffering are connected in series with the secondary battery used for testing. To discharge the secondary battery used for testing, the electronic loading device and the secondary battery used for buffering are connected to the secondary battery used for testing.

According to the charging/discharging apparatus disclosed in Japanese Patent Laid-Open No. 9-159738, electric energy generated by discharge from the secondary battery used for testing is accumulated in the secondary battery used for buffering. The electric energy accumulated in the secondary battery used for buffering can be used to charge the secondary battery used for testing. As a result, the electric energy can be effectively utilized.

However, the above-described conventional charging apparatus and charging/discharging apparatus pose problems described below.

The charging device for the secondary battery in the electric vehicle disclosed in Japanese Patent Laid-Open No. 5-207668 is connected to the vehicle and thus expected to be used outdoors. Thus, the charging apparatus is likely to be affected by ambient temperature.

The output characteristics and lifetime of the secondary battery generally vary depending on environmental temperature. This also applies to the secondary battery used for buffering provided in the charging apparatus. That is, in a low temperature environment as in winter, the direct current resistance of the secondary buffer for buffering rises to reduce the maximum current that can be output. The reduced maximum current for the secondary battery used for buffering increases the time required to charge the secondary battery. In contrast, in a high temperature environment, as in summer, the secondary battery used for buffering is left in such a high temperature atmosphere. When left in a high temperature atmosphere, the lifetime of the secondary battery used for buffering becomes shorter.

On the other hand, for the charging/discharging apparatus, which tests the charging/discharging characteristics of the secondary battery, the electrical characteristics of electric and electronic components used in the charging/discharging apparatus need to be stable in order to allow the charging/discharging characteristics of the secondary battery to be accurately evaluated.

However, the charging/discharging apparatus disclosed in Japanese Patent Laid-Open No. 9-159738 has disadvantages described below in connection with on accurate evaluation of the charging/discharging characteristics. During charging/discharging tests of the secondary battery used for testing, the secondary battery used for buffering is also charged and discharged. When a large current flows through the secondary battery, the secondary battery generates heat due to resistance heat resulting from the internal resistance thereof. Thus, the temperature of the secondary battery used for buffering rises and the electrical characteristics of the secondary battery used for buffering changes. Consecutive tests accumulatively raise the temperature of the secondary battery used for buffering. As a result, testing conditions vary for each test, preventing the secondary battery used for testing from being accurately evaluated. To avoid the adverse effect of the rise in the temperature of the secondary battery used for buffering, it is possible to wait for the temperature of the secondary battery used for buffering to become lower before the next test is started. However, in this case, a long time is required to wait for the temperature to become lower, thus reducing testing efficiency. In particular, if the charging/discharging apparatus is used in the process of manufacturing the secondary battery, the manufacturing efficiency of the secondary battery is reduced.

That is, for a charging/discharging apparatus having a secondary battery used for buffering, managing the temperature of the secondary battery used for buffering is important, as is the case with the charging apparatus.

As an outer cover for the secondary battery, a can is often used which is obtained by shaping a metal plate having a thickness about 0.3 to 0.5 mm into a shape like that of a cylinder or a box. However, if the can is used as an outer cover, heat outside the can has difficulty being transmitted to an internal battery element. Furthermore, the thermal capacity of the can cannot be neglected. Moreover, producing a secondary battery having a thickness of at most 3 mm is difficult owing to processing limits on metal plates. For the above-described reasons, it is difficult to control the temperature of the battery element inside the can over a short span or to control the temperature of the entire battery element to a uniform value.

Thus, an object of the present invention is to provide a charging apparatus and a charging/discharging apparatus which allows the temperature of the secondary battery used for buffering to be easily managed.

DISCLOSURE OF THE INVENTION

To accomplish the above-described object, a charging apparatus according to the present invention comprises a secondary battery for buffering, a current supply section, a connection section, a switching control section, and temperature adjusting means. The current supply section supplies power to the secondary battery used for buffering. The connection section is connected to a secondary battery to be charged. The switching control section switches a mode of the charging apparatus between a first mode in which power supplied by the power supply section is accumulated in the secondary battery used for buffering and a second mode in which the secondary battery to be charged is charged with the power supplied by the secondary battery used for buffering. The temperature adjusting means adjusts the temperature of the secondary battery used for buffering from outside the secondary battery used for buffering. The secondary battery used for buffering includes at least one cell comprising a battery element with a structure in which a positive electrode plate and a negative electrode plate are laminated, the battery element being sealed with an outer cover film.

Furthermore, a charging/discharging apparatus according to the present invention comprises a secondary battery for buffering, a current supply section, a connection section, a switching control section, and temperature adjusting means. The current supply section supplies power to the secondary battery used for buffering. The connection section is connected to a secondary battery to be charged and discharged. The switching control section switches a mode of the charging/discharging apparatus between a first mode in which power supplied by the power supply section is accumulated in the secondary battery used for buffering and a second mode in which the secondary battery to be charged and discharged is charged with the power supplied by the secondary battery used for buffering and a third mode in which the power accumulated in the secondary battery to be charged and discharged is discharged to the secondary battery used for buffering. The temperature adjusting means adjusts the temperature of the secondary battery used for buffering from outside of the secondary battery used for buffering. The secondary battery used for buffering includes at least one cell comprising a battery element with a positive electrode plate and a negative electrode plate laminated, the battery element being sealed with an outer cover film. As described above, the charging apparatus and charging/discharging apparatus according to the present invention includes the temperature adjusting means, which adjusts the temperature of the secondary battery used for buffering from outside of the secondary battery used for buffering. Furthermore, the secondary battery used for buffering includes the at least one cell comprising the battery element which includes the laminated positive and negative electrode plates and which is sealed with the outer cover film. The thermal capacity of the outer cover of the cell is negligibly smaller than that of the outer cover (can) of a conventional secondary battery. Moreover, the battery element is thinner than a wound battery element. As a result, the heat conductivity of the cell is improved, and the temperature of the battery element can be quickly controlled to the desired temperature from outside of the battery element. Furthermore, the reduced thickness of the cell allows the temperature of the battery element as a whole to be controlled to a uniform value. Thus, the temperature of the secondary battery used for buffering can be easily managed.

The present invention can inhibit a possible variation in the electrical characteristics of the secondary battery used for buffering resulting from a variation in the temperature of the secondary battery used for buffering. The present invention can also reduce the startup time required to allow the secondary battery used for buffering to exhibit desired electrical characteristics. As a result, the present invention can solve the thermal problems with the apparatuses in which the secondary battery used for buffering is mounted to charge or charge and discharge the target secondary battery.

The above-described and other objects, features, and advantages of the present invention will become obvious from the description below taken with reference to the accompanying drawings showing an example of the present invention.

BEST MODE FOR CARRYING OUT THE INVENTION

Exemplary Embodiment 1

Figure 1:
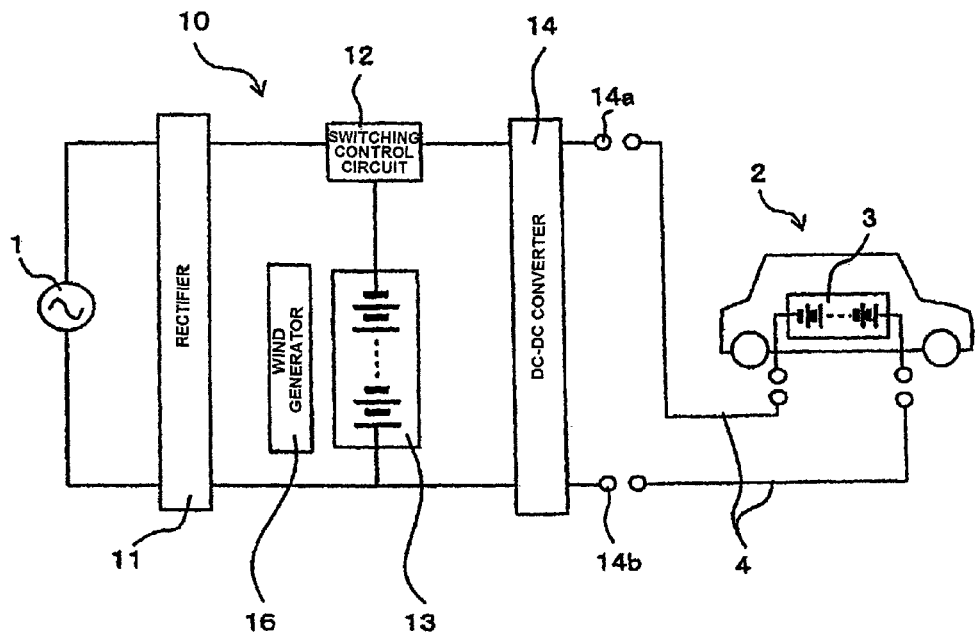
FIG. 1 is a block diagram of a charging apparatus according to a first exemplary embodiment of the present invention.

Now, a first exemplary embodiment of the present invention will be described with reference to the drawings. FIG. 1 is a block diagram of a charging apparatus according to the present exemplary embodiment. The illustrated charging apparatus is used to charge a driving battery in an electric vehicle.

Charging apparatus 10 includes rectifier 11, secondary battery 13 used for buffering, isothermal wind generator 16, switching control circuit 12, and DC-DC converter 14. Charging cables 4 are connected to output terminals 14a and 14b of DC-DC converter 14. Driving battery 3 mounted in electric vehicle 2 is charged by connecting charging cables 4 to driving battery 3.

Rectifier 11 is a device that converts alternating current power loaded from commercial alternating current power source 1 into direct current power to supply the direct current power to secondary battery 13 used for buffering. Rectifier 11 functions as a current supply section according to the present invention. Power to be charged into driving battery 3 is accumulated in secondary battery 13 used for buffering before charging driving battery 3. Switching control circuit 12 switches the operation mode of charging apparatus 10 between a first mode and a second mode. In the first mode, secondary battery 13 used for buffering is connected to rectifier 11 so that power supplied by rectifier 11 is charged into secondary battery 13 used for buffering. In the second mode, secondary battery 13 used for buffering is connected to DC-DC converter 14 so that the power accumulated in secondary battery 13 used for buffering is charged into the battery (in the present exemplary embodiment, driving battery 3 in electric vehicle 2) connected to output terminals 14a and 14b. DC-DC converter 14 is a device that increases or reduces the output voltage from secondary battery 13 used for buffering according to the voltage of the battery connected to output terminals 14a and 14b. DC-DC converter 14 functions as a connection section according to the present invention. Isothermal wind generator 16 is located adjacent to secondary battery 13 used for buffering. Isothermal wind generator 16 blows air set to the ordinary temperature utilizing, for example, heat exchange, against secondary battery 13 used for buffering to adjust the temperature of secondary battery 13 used for buffering from outside of the secondary battery 13 used for buffering.

Now, secondary battery 13 used for buffering will be described in detail with reference to FIGS. 2 and 3.

The capacity of secondary battery 13 used for buffering is greater than that of driving battery 3 to be charged by charging apparatus 10. As shown in FIG. 2, secondary battery 13 used for buffering includes a plurality of cells 20 connected together in series. FIG. 2 shows an example in which the plurality of cell 20 is connected together in series. However, the capacity can be further increased by connecting groups of cells connected together in series, in parallel with one another. Cells 20 each appear to be flat and are arranged at intervals in a thickness direction thereof. Secondary battery 13 used for buffering may be composed of single cell 20 provided that the capacity of single cell 20 is greater than that of driving battery 3.

Figure 2:
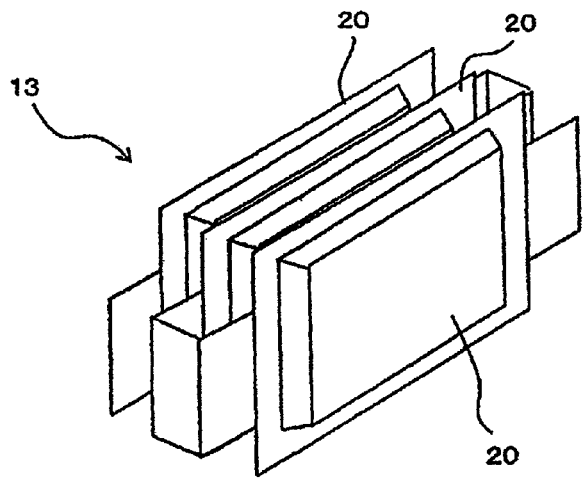
FIG. 2 is an exploded perspective view of a secondary battery for buffering in FIG. 1.
Figure 3:
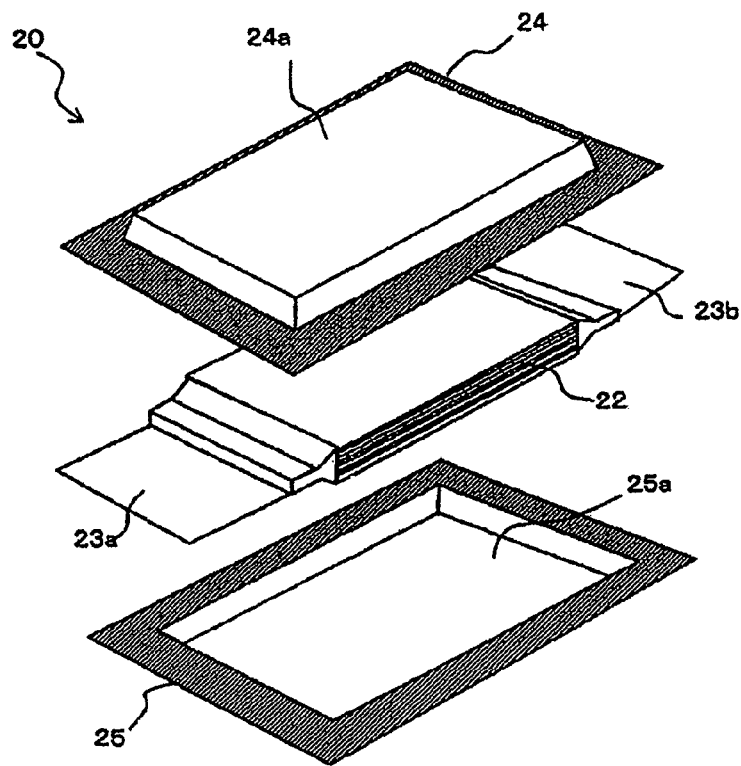
FIG. 3 is an exploded perspective view of a cell shown in FIG. 2.

FIG. 3 is an exploded perspective view of cells 20, shown in FIG. 2. Each of cells 20 includes flat battery element 22 shaped substantially like a rectangular parallelepiped and configured such that a plurality of positive electrode plates and a plurality of negative electrode plates are laminated, positive electrode tab 23a and negative electrode tab 23b connected to the positive electrode plates and negative electrode plates, respectively, of battery element 22, and two outer cover films 24 and 25 that seal battery element 22 together with an electrolyte.

Battery element 22 is configured such that the plurality of positive electrode plates and the plurality of negative electrode plates, each made up of a metal foil with an electrode material applied to the opposite surfaces thereof, are alternately laminated via separators. An uncoated portion on which the electrode material is not coated extends from one side of each of the positive and negative electrode plates. The uncoated portions of the positive electrode plates are ultrasonically welded together and connected to positive electrode tab 23a. The uncoated portions of the negative electrode plates are ultrasonically welded together and connected to negative electrode tab 23b. The uncoated portions of the ultrasonically welded portions of the positive and negative electrode plates are referred to as a collecting portion. That is, positive electrode tab 23a is connected to the positive-side current collecting portion of battery element 22. Negative electrode tab 23b is connected to the negative-side current collecting portion of battery element 22.

In the present exemplary embodiment, the positive and negative electrode plates are formed of the plurality of overlapping uncoated portions such that the uncoated portions of the positive electrode plates project in a direction opposite to that in which the uncoated portions of the negative electrode plates project. Thus, positive electrode tab 23a and negative electrode tab 23b are drawn out from opposite sides of cell 20. In the present exemplary embodiment, the planar shape of cell 20 is substantially rectangular, and positive electrode tab 23a and negative electrode tab 23b are drawn out from the short sides of the rectangle.

Materials for the positive and negative electrode plates, the electrolyte, and the like are appropriately selected according to the type of cell 20. In the present exemplary embodiment, cell 20 is a lithium ion secondary battery. In this case, an aluminum foil having a thickness 3 to 50 μm, both surfaces of which are covered with a positive electrode active material such as lithium-manganese composite oxide, cobalt acid lithium, nickel acid lithium, can be used as the positive electrode plate. A copper foil having a thickness 3 to 50 μm, both surfaces of which are covered with a carbon material doping or undoping lithium, can be used as the negative electrode plate.

The electrolyte may contain lithium salt. Moreover, if an aluminum foil is used as the metal foil of the positive electrode, an aluminum plate can be used as positive electrode tab 23a. If a copper foil is used as the metal foil of the negative electrode, a nickel or copper plate may be used as negative electrode tab 23b. If negative electrode tab 23b is formed of a copper plate, surfaces of negative electrode tab 23b may be plated with nickel. These materials are used for common lithium ion secondary batteries and will thus not be described in detail.

The separator may be a sheet-like member that can be impregnated with on electrolyte, such as a microporous film or a non-woven or woven cloth which is formed of thermoplastic resin such as polyolefin.

The planar size of outer cover films 24 and 25 is larger than that of battery element 22 so that outer cover films 24 and 25 sandwichingly surround battery element 22 on the opposite sides in a thickness direction thereof. Opposite surfaces of outer cover films 24 and 25 which overlap around the periphery of battery element 22 are heat-sealed all over the circumference of battery element 22 to seal battery element 22. In FIG. 3, the heat-sealed area is shaded. An outer cover film 24 includes cup portion 24a formed in a central area thereof so as to form a battery element housing section that is a space surrounding battery element 22. Cup portion 24a can be formed by deep drawing. In the present exemplary embodiment, cup portion 24a is formed only on outer cover film 24. However, the cup portion may be formed on both outer cover films 24 and 25. Furthermore, the flexibility of outer cover films 24 and 25 may be utilized to surround battery element 22 without forming the cup portion.

A laminate film is preferably used for outer cover films 24 and 25. The laminate film used is flexible and allows battery element 22 to be sealed by heat sealing so as to prevent the electrolyte from leaking. A typical example of the laminate film used for outer cover films 24 and 25 is a multilayer film in which a non-permeable layer made up of a thin metal film and a heat seal resin layer made up of heat sealing resin are laminated. Another example is a multilayer film in which a non-permeable layer and a protect layer are laminated across a heat seal resin layer. The protect layer is formed of a polyester film (for example, a polyethylene terephthalate film) or a nylon film. To seal battery element 22, the heat seal resin layers are located opposite each other so as to surround battery element 22.

For example, a foil having a thickness 10 to 100 μm which is formed of Al, Ti, Ti alloy, Fe, stainless steel, or Mg alloy can be used as the thin metal film that forms the non-permeable layer. The resin forming the heat seal resin layer may be, for example, polypropylene, polyethylene, an oxide modified resin thereof, polyphenylene sulfide, polyester such as polyethylene terephthalate, polyamide, ethylene-vinyl acetate copolymer. The thickness of the heat sealing resin layer is preferably 10 to 200 μm, more preferably 30 to 100 μm.

Cell 20 according to the present exemplary embodiment can be manufactured, for example, as described below.

First, cup portion 24a is formed on an outer cover film 24 as one of the two outer cover films 24 and 25 by deep drawing.

Then, battery element 22 to which positive electrode tab 23a and negative electrode tab 23b are connected are sandwichingly surrounded by outer cover films 24 and 25. At this time, outer cover films 24 and 25 are directed such that the heat seal resin layers lie opposite each other. Subsequently, the areas of outer cover films 24 and 25 which lie opposite each other around the periphery of battery element 22 are heat-sealed to each other using a heat seal head (not shown in the drawings). More specifically, the three sides of outer cover films 24 and 25 are heat-sealed to form outer cover films 24 and 25 into a bag having one open side. Subsequently, an electrolyte is injected through one open side of outer cover films 24 and 25, and the one remaining side is then heat-sealed. The one remaining side is heat-sealed in a reduced pressure atmosphere (reduced pressure chamber). After heat sealing in the reduced pressure atmosphere, cell 20 is returned to the atmospheric pressure. Then, outer cover films 24 and 25 closely come into contact with battery element 22 at the atmospheric pressure. The three sides of outer cover films 24 and 25 may be heat-sealed at the same time or one by one.

Referring back to FIG. 1, the procedure of charging using charging apparatus 10 according to the present exemplary embodiment will be described.

First, when driving battery 3 in electric vehicle 2 is not charged, charging apparatus 10 is set to the first mode by switching control circuit 12. In the first mode, secondary battery 13 used for buffering is connected to rectifier 11. In the first mode, secondary battery 13 used for buffering is charged at a low current. Once the charging of secondary battery 13 used for buffering is completed, driving battery 3 is ready for charging.

To charge driving battery 3, charging apparatus 10 is switched to the second mode by switching control circuit 12. In the second mode, secondary battery 13 used for buffering is connected to DC-DC converter 14. In the second mode, power accumulated in secondary battery 13 used for buffering is utilized to charge driving battery 3. The capacity of secondary battery 13 used for buffering is greater than that of driving battery 3. Thus, driving battery 3 is quickly charged at a high current.

In this manner, secondary battery 13 used for buffering is charged using power obtained from commercial alternating current power source 1 but at a low current. Consequently, a low load is imposed on the alternating current power source 1. On the other hand, driving battery 3 is charged at a high current using the power accumulated in secondary battery 13 used for buffering. Driving battery 3 can be charged in a short time.

The electrical characteristics of secondary battery 13 used for buffering vary with the environmental temperature. For example, in a low temperature environment, the direct current resistance value increases to reduce the maximum current that can be output. Furthermore, when secondary battery 13 used for buffering is left in a high temperature environment for a long time, secondary battery 13 used for buffering lasts shorter.

Charging apparatus 10 is often installed outdoors. Thus, in a low temperature environment, as in winter, the temperature of charging apparatus 10 and thus secondary battery 13 used for buffering becomes lower. The lowered temperature of secondary battery 13 used for buffering reduces the maximum output current from secondary battery 13 used for buffering as described above. As a result, a longer time is required to charge driving battery 3. On the other hand, in a high temperature environment, as in summer, charging apparatus 10 and secondary battery 13 used for buffering are exposed to high temperatures. As a result, secondary battery 13 used for buffering lasts shorter and needs to be more frequently replaced with a new battery. Finally, the maintenance costs of charging apparatus 10 increase.

Isothermal wind generator 16 blows wind at an ordinary temperature against secondary battery 13 used for buffering to maintain the temperature of secondary battery 13 used for buffering to within a predetermined temperature range. The predetermined temperature range corresponds to temperatures higher than those at which the desired maximum output current fails to be obtained and lower than those at which the battery is significantly degraded or at which the battery lasts for a very short time.

Furthermore, cells 20 forming secondary battery 13 used for buffering each include laminate battery element 22 in which the positive and negative electrode plates are laminated. Moreover, battery element 22 is sealed with outer cover films 24 and 25. The cell including laminate battery element 22 can be formed to be flat. Consequently, the thickness of cell 20 is smaller than that of a cell including a wound battery element formed by rolling electrode plates. The ratio of the surface area the to volume of cell 20 is higher than that of the cell including the wound battery element. Furthermore, since the film is used as the outer cover material, the heat conductivity between the interior and exterior of cell 20 is higher than that of a cell using a can.

As described above, cell 20 offers a higher heat conductivity than the cells of the other structures, and the temperature of battery element 22 can be easily controlled from outside cell 20. Furthermore, since not only battery element 22 but also cell 20 as a whole is thin, the temperature of battery element 22 as a whole can be controlled to a uniform value by externally controlling the temperature of cell 20. Thus, the effect is more significantly exerted by blowing air at an ordinary temperature against secondary battery 13 used for buffering. That is, since cell 20 is configured such that laminate battery element 22 is sealed by outer cover films 24 and 25, the temperature of cell 20 can be set equal to the ambient temperature with the temperature of battery element 22 as a whole maintained at the uniform value.

Moreover, in the present exemplary embodiment, battery element 22 is sealed in a reduced pressure atmosphere so that outer cover films 24 and 25 of cell 20 tightly contact battery element 22. This also serves to allow the temperature of battery element 22 to be externally controlled easily. Furthermore, even if secondary battery 13 used for buffering includes a plurality of cells 20, as shown in FIG. 2, the flow of air can be maintained between cells 20 by arranging cells 20 at intervals. The temperature of each of cells 20 can thus be maintained at the desired value.

Isothermal wind generator 16 need not constantly blow wind against secondary battery 13 used for buffering. Isothermal wind generator 16 needs to be driven at least when the temperature of secondary battery 13 used for buffering reaches the value at which the time required to charge driving battery 3 is affected and the value at which the lifetime of secondary battery 13 used for buffering is affected. For example, in a low temperature environment, only when driving battery 3 is charged will isothermal wind generator 16 be driven so as to set the temperature of secondary battery 13 used for buffering to the desired temperature. Specifically, secondary battery 13 used for buffering is heated immediately before the charging and cooled as required during the charging. During standby, secondary battery 13 used for buffering is not heated or cooled. That is, during standby, isothermal wind generator 16 remains stopped. The output capability is required only when driving battery 3 is charged. If secondary battery 13 used for buffering is heated for a purpose other than to charge driving battery 3, possible degradation of secondary battery 13 used for buffering is accelerated. Furthermore, while driving battery 3 is being charged, a high current flows through secondary battery 13 used for buffering, with cell 20 generating heat. Therefore, the external heating of cell 20 is preferably stopped, and cell 20 is preferably cooled. Furthermore, during standby, secondary battery 13 used for buffering is charged in the first mode. At this time, secondary battery 13 used for buffering may be cooled as required.

The driving of isothermal wind generator 16 based on the temperature, as described above, can be achieved by ON/OFF control or PID control based on detection results from a temperature sensor. The temperature sensor is desirably provided in the vicinity of secondary battery 13 used for buffering, on a surface of cell 20, or inside cell 20.

If charging apparatus 10 is used to charge the driving battery in the electric vehicle, as in the case of the present exemplary embodiment, then in a low temperature environment as in the winter, secondary battery 13 used for buffering is preferably heated to the temperature at which the desired output characteristics are exhibited, immediately before the charging of driving battery 3, as described above. Charging apparatus 10 according to the present exemplary embodiment allows the temperature of cell 20 to quickly reach the desired value as described above. This enables a reduction in the startup time required to make the electric vehicle chargeable in the low temperature environment.

Second Embodiment

Figure 4:
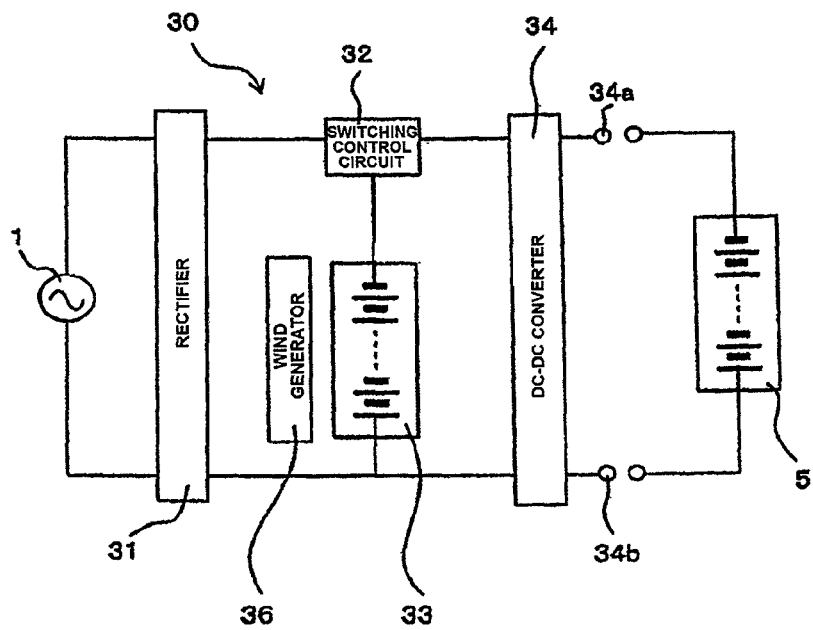
FIG. 4 is a block diagram of a charging/discharging apparatus according to a second embodiment of the present invention.

Now, a second embodiment of the present invention will be described with reference to the drawings. FIG. 4 is a block diagram of a charging/discharging apparatus according to the present exemplary embodiment. The illustrated charging-discharging apparatus is used to test the secondary battery for charging/discharging characteristics during the manufacturing process.

Charging/discharging apparatus 30 according to the present exemplary embodiment includes rectifier 31, secondary battery 33 used for buffering, isothermal wind generator 36, switching control circuit 32, and DC-DC converter 34. Secondary battery 5 used for testing is connected to output terminals 34a and 34b of DC-DC converter 34 to test secondary battery 5 used for testing for the charging/discharging characteristics.

Rectifier 31, secondary battery 33 used for buffering, isothermal wind generator 36, and DC-DC converter 34 are similar to those described in the first embodiment and thus will not be described. Furthermore, charging/discharging apparatus 30 includes a third mode in addition to the first and second modes, provided in charging apparatus 10 (see FIG. 1), described in the first embodiment. In the third mode, secondary battery 33 used for buffering is connected to DC-DC converter 34 so that power accumulated in the battery (in the present exemplary embodiment, secondary battery 5 used for testing) connected to output terminals 34a and 34b is discharged to secondary battery 33 used for buffering. Switching control circuit 32 switches between the first mode and the second mode and the third mode.

The operation of the charging/discharging apparatus 30 will be described below.

First, before testing secondary battery 5 used for testing, charging/discharging apparatus 30 is set to the first mode by switching control circuit 32. Thus, secondary battery 33 used for buffering is charged at a low current.

After the charging of secondary battery 33 used for buffering is completed, charging/discharging apparatus 30 is switched to the second mode by switching control circuit 32. Thus, the power accumulated in secondary battery 33 used for buffering is utilized to charge secondary battery 5 used for testing. The capacity of secondary battery 33 used for buffering is greater than that of secondary battery 5 used for testing. Consequently, secondary battery 5 used for testing is quickly charged at a high current. During the charging of secondary battery 5 used for testing, by measuring the electrical characteristics, charging time, and the like of secondary battery 5 used for testing, the charging characteristics of secondary battery 5 used for testing are measured.

After the charging characteristics of secondary battery 5 used for testing are measured, charging/discharging apparatus 30 is switched to the third mode by switching control circuit 32. Thus, the power accumulated in secondary battery 5 used for testing is discharged and accumulated in secondary battery 33 used for buffering again. During the discharge from secondary battery 5 used for testing, the electrical characteristics, discharging time, and the like of secondary battery 5 used for testing are measured and thereby the discharging characteristics of secondary battery 5 used for testing are measured.

After the charging/discharging testing of one secondary battery 5 used for testing are completed, secondary battery 5 used for testing is removed from charging/discharging apparatus 30. Subsequently, next secondary battery 5 used for testing is connected to charging/discharging apparatus 30, and subjected to charging-discharging testing. When secondary battery 5 used for testing is replaced, the charging condition of secondary battery 33 used for buffering is detected. Provided that power sufficient to charge secondary battery 5 used for testing is accumulated in secondary battery 33 used for buffering, charging/discharging apparatus 30 consecutively carries out the charging/discharging testing on next secondary battery 5 used for testing without being switched to the first mode. If the power accumulated in secondary battery 33 used for buffering is insufficient to charge secondary battery 5 used for testing, charging/discharging apparatus 30 is switched to the first mode to charge secondary battery 33 used for buffering. Once the charging of secondary battery 33 used for buffering is completed, the charging/discharging testing of next secondary battery 5 used for testing is started. The charging condition of secondary battery 33 used for buffering can be detected by measuring the voltage between the opposite terminals of secondary battery 33 used for buffering.

As described above, the power discharged from secondary battery 5 used for testing is accumulated in secondary battery 33 used for buffering and utilized for the charging/discharging testing of next secondary battery 5 used for testing. Electric energy is thus effectively utilized.

Secondary battery 33 used for buffering supplies power to secondary battery 5 used for testing and receives power from secondary battery 5 used for testing. Thus, when the electrical characteristics of secondary battery 33 used for buffering vary with the charging/discharging testing of secondary battery 5 used for testing, the accuracy with which secondary battery 5 used for testing is evaluated becomes lower. The electrical characteristics of secondary battery 33 used for buffering also vary depending on the environmental temperature and heat generated by secondary battery 33 used for buffering resulting from charging or discharging secondary battery 33 used for buffering.

Thus, in the present exemplary embodiment, as is the case with the first exemplary embodiment, isothermal wind generator 36 blows air at the ordinary temperature against secondary battery 33 used for buffering during the charging/discharging testing of secondary battery 5 used for testing to maintain a constant ambient temperature of secondary battery 33 used for buffering. Furthermore, the cell forming secondary battery 33 used for buffering is configured such that a laminate battery element is sealed by outer cover films. Thus, with the temperature of the battery element as a whole maintained at a uniform value, the temperature of the cell can be quickly set equal to the ambient temperature. As a result, the electrical characteristics of secondary battery 33 used for buffering are stabilized to improve the evaluation accuracy of secondary battery 5 used for testing.

In the first and second exemplary embodiments as described above, the example has been described in which isothermal wind is blown against the secondary battery used for buffering to externally maintain the secondary battery used for buffering at an ordinary temperature from the outside. When air is blown against the secondary battery used for buffering to maintain the temperature of the secondary battery used for buffering within a predetermined temperature range, the blown air need not be heated or cooled but the outside air may be blown directly against the secondary battery used for buffering. For example, the outside air whose temperature is not controlled may be blown against the secondary battery used for buffering provided that a possible rise in temperature can be inhibited when the secondary battery used for buffering is charged or discharged. A cooling fan may be provided which simply blows the outside air against the secondary battery used for buffering. Furthermore, instead of maintaining the temperature of the secondary battery used for buffering constant, it is possible to just heat or cool the secondary battery used for buffering. An example of temperature adjusting means applicable to the present invention will be described below in connection with each of the cases where the secondary battery used for buffering is only heated or cooled and where the temperature of the secondary battery used for buffering is maintained constant.

(Case where the Secondary Battery Used for Buffering is Only Heated)

For example, if the charging apparatus according to the present invention is used to charge an electric vehicle, then in a low temperature environment as in winter, temperature adjusting means may be used which only heats the secondary battery used for buffering. Such temperature adjusting means may be a heating wire such as a nichrome wire or a heating element such as a ceramic heating element. The heating element may be attached to the secondary battery used for buffering directly (specifically, to the cell or a cell case accommodating the cell) or via a metal plate. Alternatively, the heating element may be placed away from the secondary battery used for buffering so that air heated by the heating element can be blown against the secondary battery used for buffering by a fan. A Peltier element can also be used as a heating element.

Moreover, with the temperature sensor provided in the vicinity of the secondary battery used for buffering, on a surface of the cell, or inside the cell, the driving of the temperature adjusting means can be controlled by ON/OFF control or PID control based on detection results from a temperature sensor.

(Case where the Secondary Battery Used for Buffering is Only Cooled)

If the charging/discharging apparatus is used to consecutively carry out the charging/discharging characteristic testing, the secondary battery used for buffering generates heat. Consequently, in this case, the temperature of the secondary battery used for buffering may be adjusted simply by cooling the secondary battery used for buffering. In this case, a pipe is laid out in contact with the secondary battery used for buffering (specifically, with the cell or the cell case accommodating the cell); a fluid such as a gas or a liquid circulates through the pipe, and the pipe includes a cooling device in the middle of a circulation path and thereby the secondary battery used for buffering can be cooled with the fluid cooled by the cooling device.

Examples of the cooling device include a radiator, a cooling device utilizing compression/adiabatic expansion of the fluid, and a cooling device utilizing a Peltier element. The pipe may be contacted with the secondary battery used for buffering directly or via a metal plate. If the pipe is in contact with the secondary battery used for buffering via the metal plate, the cooled metal plate cools the secondary battery used for buffering. Alternatively, if the cooling device utilizing the Peltier element is used, the Peltier element may be contacted with the secondary battery used for buffering directly or via a metal plate.

Furthermore, if the temperature of the environment in which the charging apparatus or the charging/discharging apparatus is installed is sufficiently low compared to that of the secondary battery used for buffering, it may be sufficient to blow the air that is outside of the charging apparatus or the charging/discharging apparatus against the secondary battery used for buffering using the fan or the like.

Moreover, with the temperature sensor provided in the vicinity of the secondary battery used for buffering, on the surface of the cell, or inside the cell, the driving of the cooling device, the fan or the like can be controlled by ON/OFF control or PID control based on detection results from a temperature sensor.

(Case where the Temperature is Maintained Constant)

The isothermal wind generator described in the exemplary embodiments is means for maintaining the temperature of the secondary battery used for buffering constant. Furthermore, the above-described various devices used to heat and cool the secondary battery used for buffering may be combined and appropriately operated according to the temperature of the secondary battery used for buffering. Furthermore, if the charging apparatus or the charging/discharging apparatus is installed in a room whose temperature is controlled to be kept constant, then it is sufficient to blow the air in the room in which the charging apparatus or the charging/discharging apparatus is installed, against the secondary battery used for buffering using a fan or the like.

If a temperature control device with a Peltier element is used as temperature adjusting means, the Peltier element can both heat and cool the secondary battery used for buffering.

Figure 5:
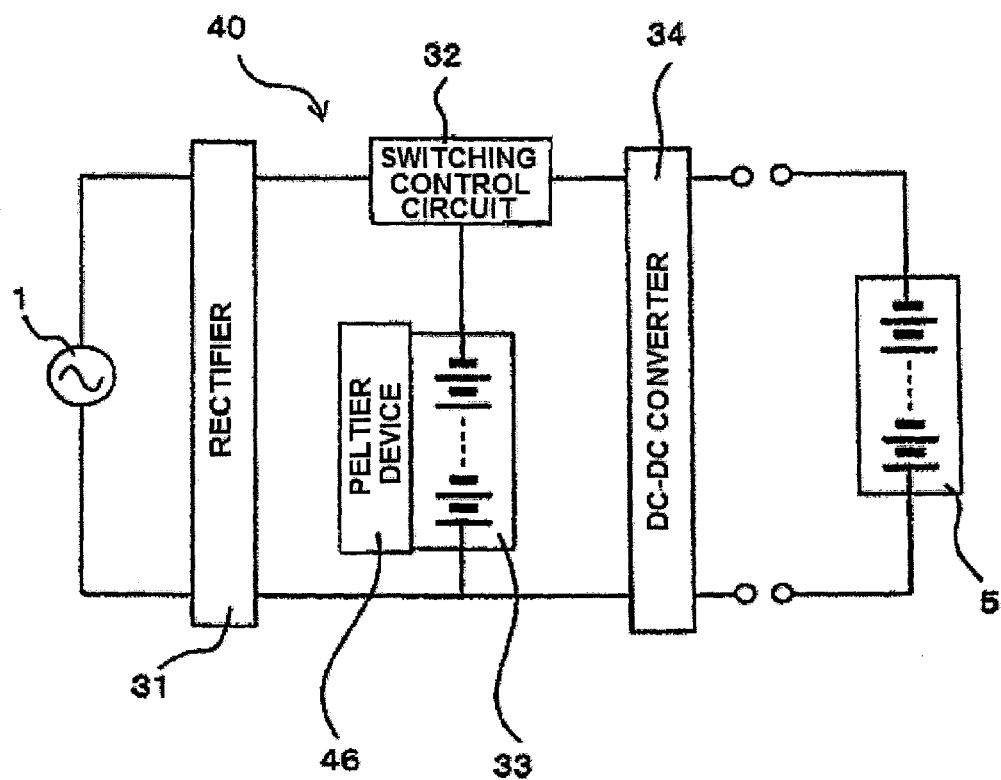
FIG. 5 is a block diagram of a charging/discharging apparatus including a Peltier temperature control device according to the present invention.

FIG. 5 illustrates a block diagram of a charging/discharging apparatus in which a Peltier element is used for heating and cooling. Charging/discharging apparatus 40 illustrated in FIG. 5 obtains power from alternating current power source 1 to carry out the charging/discharging characteristic testing on secondary battery 5 used for testing. Charging/discharging apparatus 40 includes Peltier temperature control device 46 that uses a Peltier element to heat and cool secondary battery 33 used for buffering. Rectifier 31, switching control circuit 32, secondary battery 33 used for buffering, and DC-DC converter 34 are similar to those described in the second exemplary embodiment. These components are thus denoted by the same reference numerals as those used in FIG. 4 and will not be described below.

Peltier temperature control device 46 includes a Peltier element and a control circuit that controls the driving of the Peltier element. The Peltier element is attached to secondary battery 33 used for buffering (specifically, to the cell or the cell case accommodating the cell) directly or via a metal plate.

With the above-described configuration, the Peltier element is driven as required to allow the temperature of secondary battery 33 used for buffering to be kept constant. The Peltier temperature control device illustrated in FIG. 5 can be used not only to keep the temperature of the secondary battery used for buffering constant but also to only heat or cool the secondary battery used for buffering.

Furthermore, if the temperature of the secondary battery used for buffering is kept constant, then with the temperature sensor provided in the vicinity of the secondary battery used for buffering, on the surface of the cell, or inside the cell, the driving of the temperature adjusting means can be controlled by ON/OFF control or PID control based on detection results from a temperature sensor.

The invention claimed is:

1. A charging apparatus for charging a secondary battery to be charged, comprising:
a secondary battery for buffering;
a current supply section for supplying power to the secondary battery used for buffering; and
a temperature adjusting element that adjusts a temperature of the secondary battery used for buffering from outside of the secondary battery used for buffering,
wherein the temperature adjusting element heats the secondary battery used for buffering immediately before the secondary battery to be charged is charged with the power supplied by the secondary battery used for buffering,
wherein the temperature adjusting element cools the secondary battery used for buffering while the secondary battery to be charged is charged with the power supplied by the secondary battery used for buffering,
wherein the cooling for the secondary battery used for buffering by the temperature adjusting element occurs after the heating for the secondary battery used for buffering by the temperature adjusting element, and
wherein the secondary battery used for buffering is an outer film cover type battery.

2. The charging apparatus according to claim 1, wherein the temperature adjusting element is installed adjacent to the secondary battery used for buffering to blow wind against the secondary battery used for buffering in order to maintain the temperature of the secondary battery used for buffering within a predetermined temperature range.

3. The charging apparatus according to claim 1, wherein the temperature adjusting element includes a heating element for heating the secondary battery used for buffering.

4. The charging apparatus according to claim 1, wherein the temperature adjusting element does not adjust the temperature of the secondary battery used for buffering other than immediately before the secondary battery to be charged is charged with the power supplied by the secondary battery used for buffering and while the secondary battery to be charged is charged with the power supplied by the secondary battery used for buffering.

5. The charging apparatus according to claim 1, wherein the charging apparatus comprises a connection section connected to the secondary battery to be charged.

6. The charging apparatus according to claim 1, wherein the charging apparatus comprises a switching control section for switching the charging apparatus between a first mode in which power supplied by the power supply section is accumulated in the secondary battery used for buffering and a second mode in which the secondary battery to be charged is charged with the power supplied by the secondary battery used for buffering.

7. The charging apparatus according to claim 1, wherein the secondary battery to be charged is a vehicle-mounted battery.

8. The charging apparatus according to claim 1, wherein the temperature adjusting element cools the secondary battery used for buffering as the secondary battery used for buffering starts to charge the secondary battery to be charged.

9. The charging apparatus according to claim 1, wherein a capacity of the secondary battery used for buffering is greater than a capacity of the secondary battery to be charged.

10. A charging/discharging apparatus for charging and discharging a secondary battery to be charged and discharged, comprising:
a secondary battery for buffering;
a current supply section for supplying power to the secondary battery used for buffering; and
a temperature adjusting element that adjusts a temperature of the secondary battery used for buffering from outside of the secondary battery used for buffering,
wherein the temperature adjusting element heats the secondary battery used for buffering immediately before the secondary battery to be charged and discharged is charged with the power supplied by the secondary battery used for buffering,
wherein the temperature adjusting element cools the secondary battery used for buffering while the secondary battery to be charged and discharged is charged with the power supplied by the secondary battery used for buffering, or is discharged to charge the secondary battery used for buffering,
wherein the cooling for the secondary battery used for buffering by the temperature adjusting element occurs after the heating for the secondary battery used for buffering by the temperature adjusting element, and
wherein the secondary battery used for buffering is an outer film cover type battery.

11. The charging/discharging apparatus according to claim 10, wherein the temperature adjusting element is installed adjacent to the secondary battery used for buffering to blow wind against the secondary battery used for buffering in order to maintain the temperature of the secondary battery used for buffering within a predetermined temperature range.

12. The charging/discharging apparatus according to claim 10, wherein the temperature adjusting element does not adjust the temperature of the secondary battery used for buffering other than immediately before the secondary battery to be charged and discharged is charged with the power supplied by the secondary battery used for buffering and while the secondary battery to be charged and discharged is charged with the power supplied by the secondary battery to be used for buffering.

13. The charging/discharging apparatus according to claim 10, wherein the charging/discharging apparatus comprises a connection section connected to the secondary battery to be charged and discharged.

14. The charging/discharging apparatus according to claim 10, wherein the charging/discharging apparatus comprises a switching control section for switching the charging/discharging apparatus between a first mode in which power supplied by the power supply section is accumulated in the secondary battery used for buffering and a second mode in which the secondary battery to be charged and discharged is charged with the power supplied by the secondary battery used for buffering and a third mode in which the power accumulated in the secondary battery to be charged and discharged is discharged to charge the secondary battery used for buffering.

15. The charging/discharging apparatus according to claim 10, wherein the temperature adjusting element includes a heating element for heating the secondary battery used for buffering.

16. The charging/discharging apparatus according to claim 10, wherein the secondary battery to be charged and discharged is a vehicle-mounted battery.

17. The charging/discharging apparatus according to claim 10, wherein the temperature adjusting element cools the secondary battery used for buffering as the secondary battery used for buffering starts to charge the secondary battery to be charged and discharged, or starts to be charged by the secondary battery to be charged and discharged.

* * * * *